United States Patent
Hishikawa et al.

(10) Patent No.: US 6,206,583 B1
(45) Date of Patent: Mar. 27, 2001

(54) OPTICAL FIBER FUSION SPLICER WITH COMMUNICATION DEVICE

(75) Inventors: Yoshifumi Hishikawa; Kazuo Watanabe, both of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/057,470

(22) Filed: Apr. 9, 1998

(30) Foreign Application Priority Data

Apr. 10, 1997 (JP) .................................................. 9-092379

(51) Int. Cl.⁷ ............................... G02B 6/00; G02B 6/255
(52) U.S. Cl. ................................................................ 385/96
(58) Field of Search ................................. 385/95–96, 147

(56) References Cited

U.S. PATENT DOCUMENTS

| | | |
|---|---|---|
| 5,524,163 | 6/1996 | Kobayashi . |
| 5,611,015 | 3/1997 | Tokumaru . |

FOREIGN PATENT DOCUMENTS

| | | | |
|---|---|---|---|
| 30 19 264 | 11/1981 | (DE) . | |
| 2 148 538 | 5/1985 | (EP) . | |
| 0 510 519 | 10/1992 | (EP) . | |
| 61-112104 | 5/1986 | (JP) . | |
| 5-150131 | 6/1993 | (JP) . | |
| 10-42043 | 2/1998 | (JP) . | |
| 9-092379 | 9/1999 | (JP) . | |
| 96/12980 | 5/1996 | (WO) . | |
| 129980 | * 5/1996 | (WO) | ..................................... 385/96 |
| WO9612980 | * 5/1996 | (WO) | ..................................... 385/96 |

OTHER PUBLICATIONS

Patent Abstracts of Japan, vol. 12, No. 368 (P–766), Oct. 4, 1988 & JP 63 118703 A (NEC Corp; Others: 01), May 23, 1988.

Patent Abstracts of Japan, vol. 17, No. 539 (P–1621), Sep. 28, 1993 & JP 05 150131 A (Sumitomo Electric Ind Ltd), Jun. 18, 1993.

* cited by examiner

Primary Examiner—Akm E. Ullah
(74) Attorney, Agent, or Firm—Pillsbury Madison & Sutro LLP

(57) ABSTRACT

A fusion splicer for which maintenance can be performed efficiently is provided. A fusion splicer 1 for splicing optical fibers comprises a CCD camera 14 for capturing an image of a fusion splicing process of the optical fibers, a main memory 21 for storing image data obtained by the CCD camera 14, and a communication controller 3 adapted to make the image data transmittable and effect communication with a service station.

2 Claims, 5 Drawing Sheets

OPTICAL FIBER FUSION SPLICER WITH COMMUNICATION DEVICE

BACKGROUND OF THE INVENTION

1. Field of the Invention

The present invention relates to a fusion splicer having a function of splicing optical fibers and a communication function for transmitting its operation state or the like.

2. Related Background Art

As a conventional apparatus for splicing optical fibers, fusion splicers have been known. In a fusion splicer, end portions of a pair of optical fiber line materials are butted against each other, and thus butted portions are fused by discharge so as to be connected together. Conventional optical fiber fusion splicers are disclosed in U.S. Pat. Nos. 5,524,163 and 5,611,015.

SUMMARY OF THE INVENTION

In general, fusion splicers are sold by their manufacturers to optical fiber providers so as to be used by the latter for installing optical fiber networks and so forth. There may be cases where troubles occur in operations of a fusion splicer upon its use. In such a case, when its site of use is located far from a service station of the manufacturer, the maintenance of the fusion splicer is performed by a serviceperson of the manufacturer over the telephone or the like. For example, the manufacturer's serviceperson instructs an operator at the site of use to operate the fusion splicer and the operation responds how the fusion splicer acts consequently by telephone or fax. The trouble in operation of the fusion splicer may disappear when it is caused by an operation miss. When it appears to be a failure of the fusion splicer, on the other hand, the fusion splicer is sent back and repaired for its maintenance.

In the maintenance of the fusion splicer at the remote site, however, the instruction of the serviceperson may not be delivered to the operator clearly or the operator may not be able to fully explain the action of the fusion splicer, thus failing to effect its maintenance efficiently. Namely, there are cases where the action of the fusion splicer is hard to report correctly by telephone, fax, and the like, remarkably when the user of the fusion splicer is not accustomed to its handling. The serviceperson may go to the site or the fusion splicer itself may be sent back to the serviceperson. When the trouble is caused by a handling miss of the fusion splicer or a minor error in operation setting, however, this process becomes quite inefficient.

In order to overcome the foregoing problems, it is an object of the present invention to provide a fusion splicer which allows maintenance to be performed efficiently.

Thus, the present invention provides a fusion splicer for splicing optical fibers, which comprises imaging means for capturing an image of a fusion splicing process of the optical fibers, storage means for storing image data obtained by the imaging means, and communication means for transmitting the image data and communicating with a service station.

In accordance with the present invention, an image of the fusion splicing process of optical fibers can be captured so as to store its image data, which can be transmitted to the service station via a public network or the like. When there is a trouble in operation of the fusion splicer, the stored image data are transmitted to the service station. According to the image data, the trouble of the fusion splicer can be grasped accurately on the service station by the manufacturer's service person, thus allowing the user of the fusion splicer to be provided with an appropriate advice.

The fusion splicer in accordance with the present invention may further comprise presetting parameter control means for changing, in response to a signal transmitted from the service station, a presetting parameter of an operation concerning fusion splicing of the optical fibers.

In this case, the presetting parameter for the operation concerning fusion splicing of the optical fibers can be appropriately adjusted by the remote service station via a public network or the like. Consequently, in the case where the trouble in operation of the fusion splicer is caused by maladjustment of the presetting parameter concerning its operation, more accurate maintenance of the fusion splicer can be performed by adjusting the presetting parameter.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
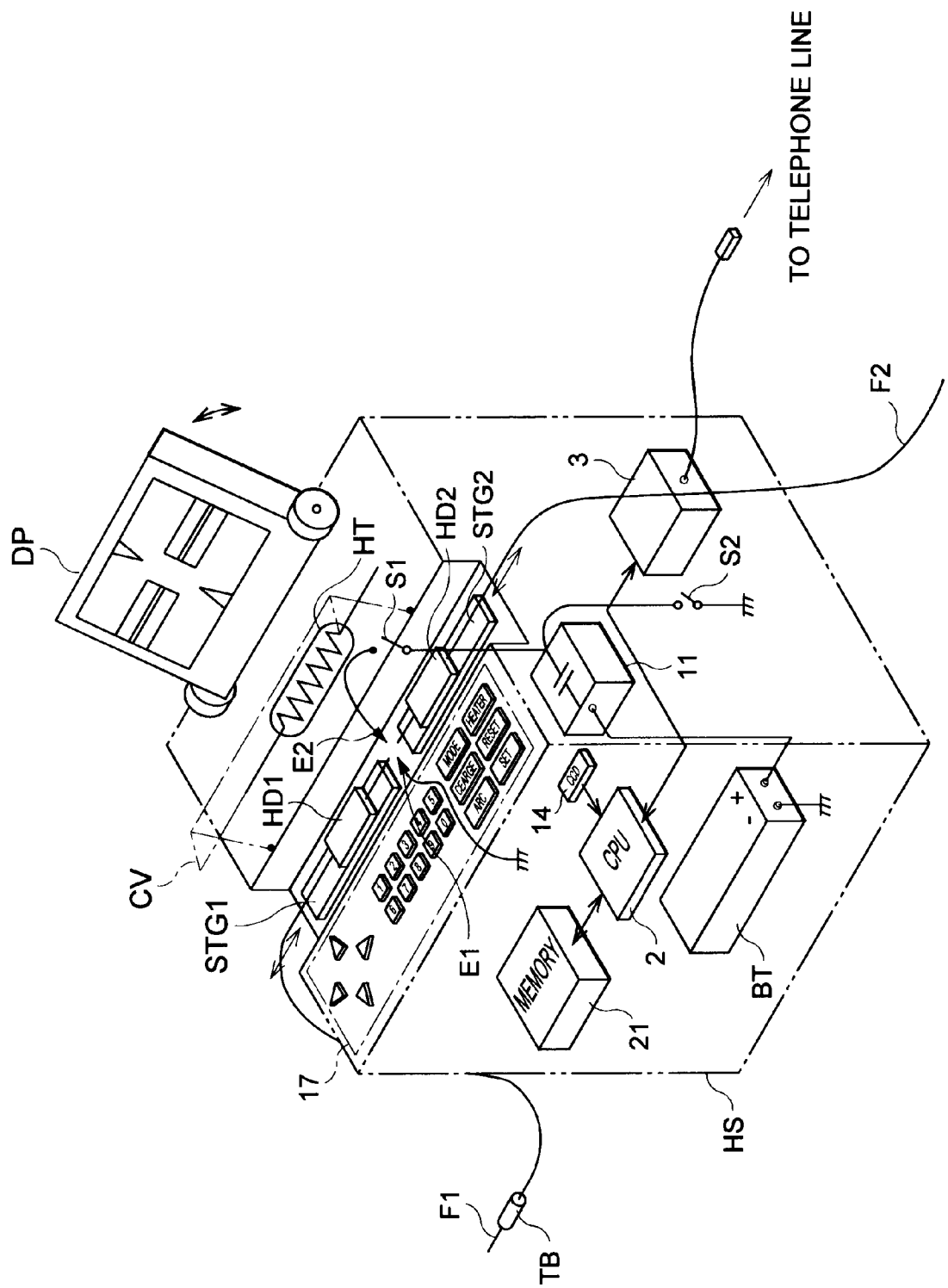
FIG. 1 is a perspective view of a fusion splicer.

In the following, an example of embodiments of the present invention will be explained. Among drawings, constituents identical to each other will be referred to with numerals or letters identical to each other, without their overlapping explanations being repeated. Also, ratios in size of elements in the drawings do not always correspond to those explained.

FIG. 1 shows the fusion splicer in accordance with this embodiment. The depicted fusion splicer 1 comprises stages STG1 and STG2 disposed in alignment with each other on the outer surface of a housing HS. The stages STG1 and STG2 are driven along the longitudinal direction of optical fibers F1 and F2, independently from each other, by a driving mechanism 12 (see FIG. 3) disposed within the housing HS. The optical fibers F1 and F2 are held by holders HD1 and HD2, which are secured to the stages STG1 and STG2, respectively. Accordingly, as the stages STG1 and STG2 are moved in the longitudinal direction, the fibers F1 and F2 are moved in the longitudinal direction as well. The driving mechanism 12 can move the stages STG1 and STG2 in the widthwise direction orthogonal to the longitudinal direction and further can rotate them in θ direction about the longitudinal direction.

Ends of the optical fibers F1 and F2 face each other across a gap, whereas needle-shaped discharge electrodes E1 and E2 are disposed such that this gap is interposed therebetween. When a charge button and a set button in an operator unit 17 are pressed, a switch S2 between one terminal of a discharge unit 11 and one terminal of a battery BT is turned on, whereby charges are accumulated within a capacitor of the discharge unit 11. When an arc button and the set button of the operator unit 17 are pressed, the switch S2 is turned off, and a switch S1 is turned on, whereby discharge occurs between the discharge electrodes E1 and E2. Upon discharge between the discharge electrodes E1 and E2, the resulting heat melts the ends of the optical fibers F1 and F2, whereby the optical fibers F1 and F2 are spliced together. Before the fibers F1 and F2 are spliced together, the fiber F1 has been caused to pass through a reinforcement element TB. After the splicing, the reinforcement element TB is moved to the splicing section of the fibers. Subsequently, the fibers F1 and F2 are moved onto a heater HT together with the reinforcement element TB. Here, as a heating button and the set button are pressed, the splicing section is heated, whereby the reinforcement element TB is shrunk, thus allowing the inner surface of the reinforcement element TB to attach to the outer surface of the fibers.

An image of the ends of the optical fibers F1 and F2 is captured by a CCD camera 14, and thus captured image is displayed on a monitor DP attached to the housing HS, while its image data are stored into a memory 21. The image data within the memory 21 are outputted to a telephone line via a communication controller (communication device) 3, whereas a control signal for controlling a CPU 2 is inputted from the telephone line via the communication controller 3.

When a reset button is pressed, contents of a determined operation are canceled. As a mode button is pressed, the fiber moving mode, discharge control mode, image data storage mode, and communication mode mentioned above are switched. The above-mentioned various kinds of controls are executed by control signals from the CPU 2.

Figure 2:
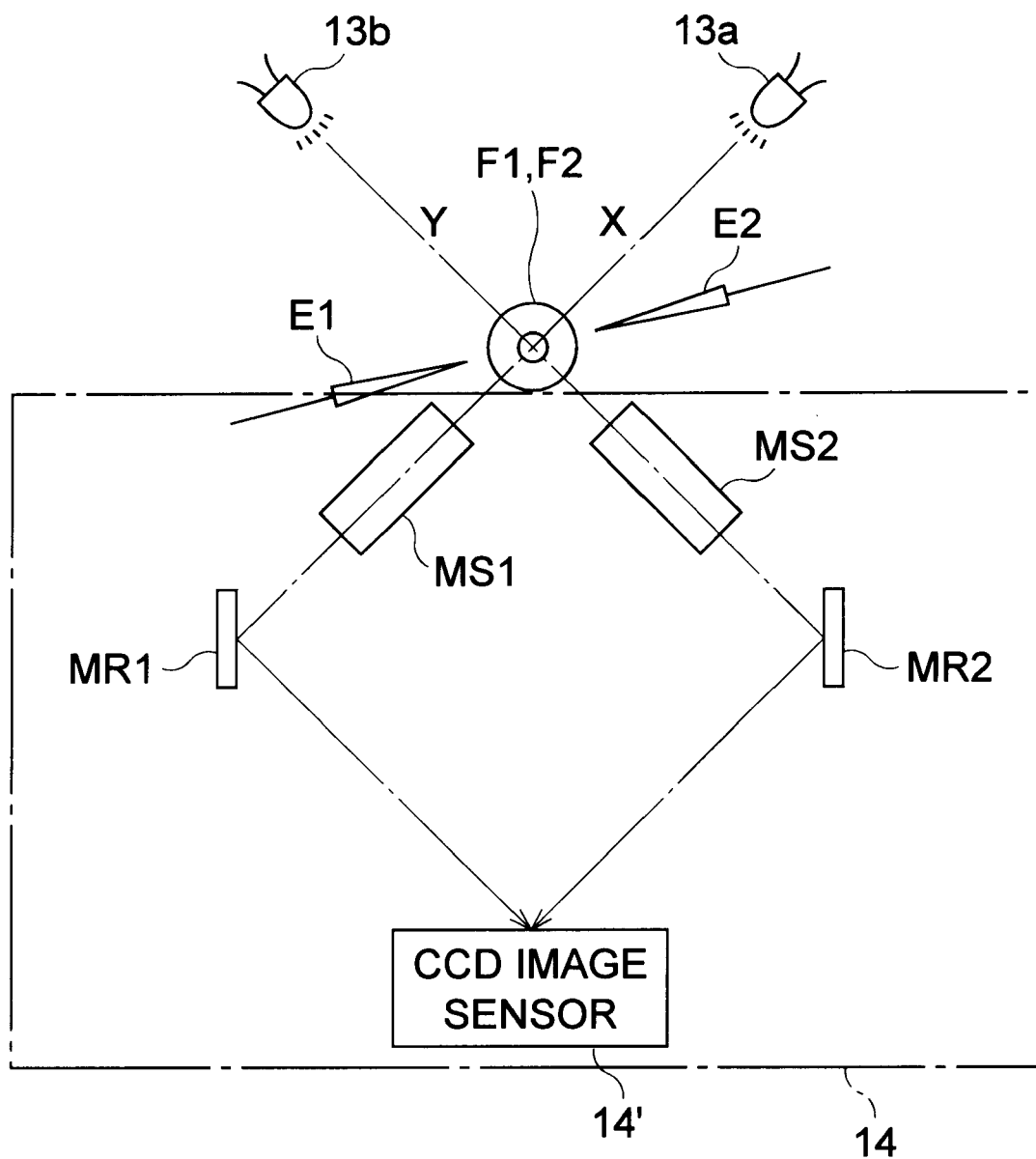
FIG. 2 is an explanatory view showing how optical fibers F1 and F2 are observed by a CCD image camera 14.

FIG. 2 is an explanatory view showing how the optical fibers F1 and F2 are observed by the CCD camera 14. The fusion splicer 1 is equipped with an illumination 13. The latter is means for illuminating the splicing section of the optical fibers. The illumination 13 is constituted by an X-axis illumination 13a and a Y-axis illumination 13b which illuminate the splicing section of the optical fibers from directions orthogonal to each other. Here, the X and Y axes refer to two directions in parallel to end faces of the optical fibers to be spliced together, while being orthogonal to each other.

The CCD camera 14 constituted by the CCD image sensor 14' is means for capturing images of the process of fusion-splicing the optical fibers, and is disposed so as to face the splicing section of the optical fibers. The CCD camera 14 comprises, as optical systems, a pair of microscopes MS1 and MS2 for capturing images of the step of fusion-splicing the optical fibers along directions orthogonal to each other.

Specifically, an illumination 13a made of an LED is disposed on an extension of X direction orthogonal to the longitudinal direction of the optical fibers F1 and F2. An illumination 13b made of an LED is disposed on an extension of Y direction orthogonal to both the longitudinal direction of the optical fibers F1 and F2 and X direction. Consequently, as the light emitted from the illumination 13a is transmitted across the optical fibers F1 and F2 and through the microscope MS1 and then is reflected by a mirror MR1, an image of the optical fibers F1 and F2 perpendicular to X direction is projected onto the CCD camera 14. On the other hand, as the light emitted from the illumination 13b is transmitted across the optical fibers F1 and F2 and through the microscope MS2 and then is reflected by a mirror MR2, an image of the optical fibers F1 and F2 perpendicular to Y direction is projected onto the CCD camera 14. The illuminations 13a and 13b are selectively lit such that only one of X and Y images is projected onto the CCD camera 14 at once. Each of the illumination 13 and CCD image sensor 14' may be constituted by either a single unit or a plurality of units. Also, without being restricted to the CCD image sensor 14', other devices may be used as the imaging means as long as an image of the optical fiber splicing process can be captured thereby.

Figure 3:
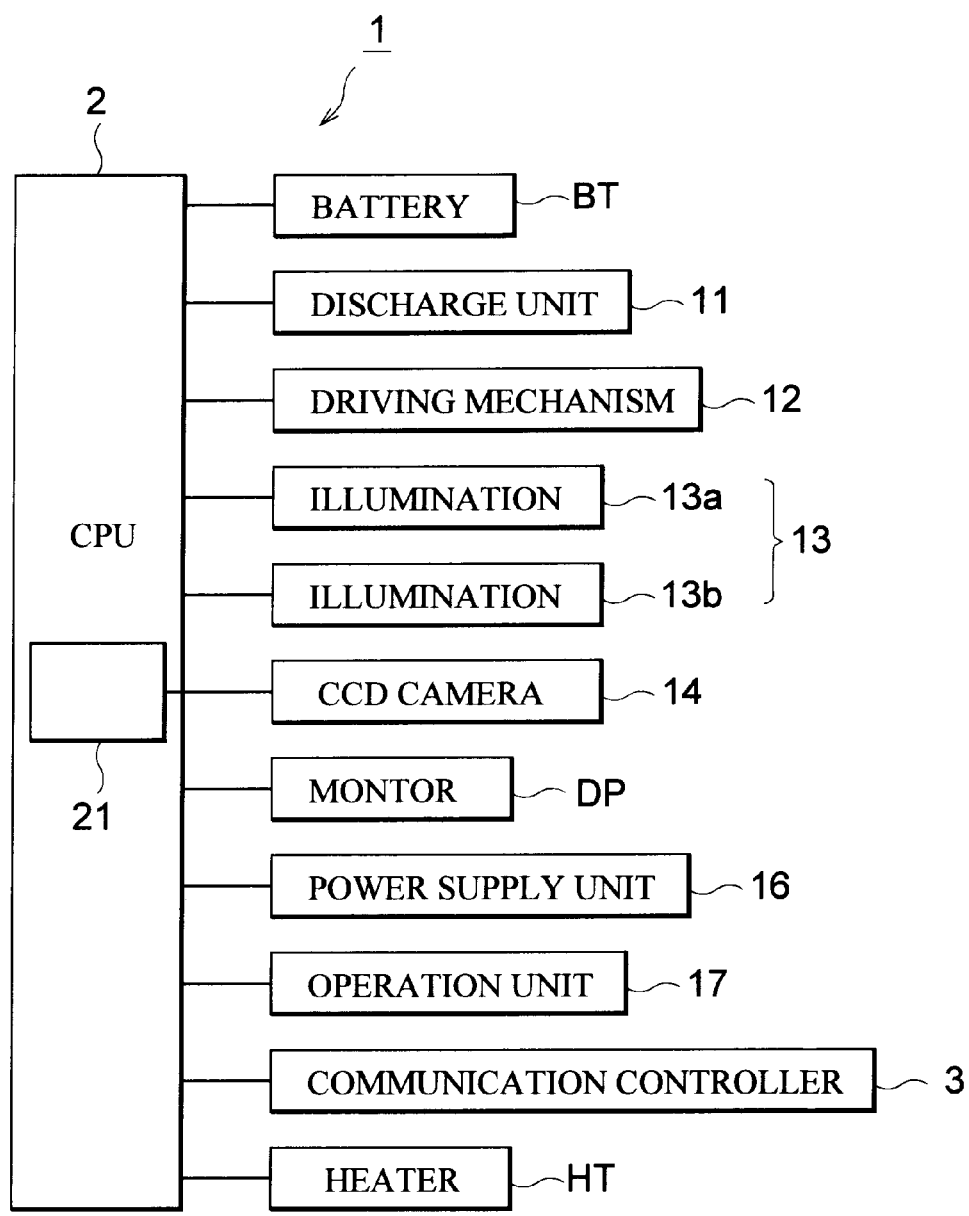
FIG. 3 is an explanatory view of the fusion splicer.

FIG. 3 is a schematic view of the electric configuration of the fusion splicer 1 in accordance with this embodiment. The CPU 2, which controls operations of the fusion splicer 1, is constituted by a microcomputer or the like. Also, the fusion splicer 1 is equipped with the discharge unit 11 for effecting fusion splicing, and the driving mechanism 12 for moving the alignment stages STG1 and STG2. The discharge unit 11 has a pair of electrodes directed to an alignment table for installing the optical fibers. According to an instruction from the CPU 2, the electrodes discharge, thereby fusion-splicing the optical fibers disposed on the alignment stages STG1 and STG2. The driving mechanism 12 is a mechanism for moving the alignment stages STG1 and STG2 such that, for example, the end faces of the optical fibers to be spliced are butted against each other or the optical fibers are centered with respect to each other.

The CPU 2 of the fusion splicer 1 accommodates therein a still image file generator (not depicted) and the main memory 21. The still image file generator receives the image data outputted from the CCD image sensor 14' and converts thus received image data into an still image file of a still image. Preferably, the still image file generator employs a compressed file system such as JPEG or TIFF. In this case, even when the storage capacity of the main memory 21 is small, a larger amount of image data can be stored. The main memory 21 is a storage means for storing instructions and data in the CPU 2, as well as the image data as the image file outputted from the still image file generator. The image data are stored when appropriate at each step of fusion-splicing the optical fibers. For example, in the fusion splicing effected by the fusion splicer 1, image data are stored at each of brightness inspection for inspecting the lighting state caused by the illumination 13a (in X axis), brightness inspection for inspecting the lighting state caused by the illumination 13b (in Y axis), disposition of the optical fibers to be spliced into V-shaped grooves of the alignment stages STG1 and STG2, discharge cleaning (sputtering) of the splicing section of optical fibers, rough centering of the optical fibers, focus adjustment (in X and Y axes) of the microscopes disposed in the optical system of the CCD camera 14, minute adjustment of the distance between the end faces of the optical fibers to be spliced, end face inspection of the optical fibers (in X and Y axes), outer diameter centering or core centering of the optical fibers (in X and Y axes), and splice inspection upon or after fusion splicing by discharge (in X and Y axes). As this storage means, an external storage device disposed outside the CPU 2 may also be used.

The fusion splicer 1 is equipped with a power supply unit 16 in addition to the battery BT. The power supply unit 16 is a unit for converting an external power supply into an applied voltage supplied to each section of the fusion splicer 1.

Figure 4:
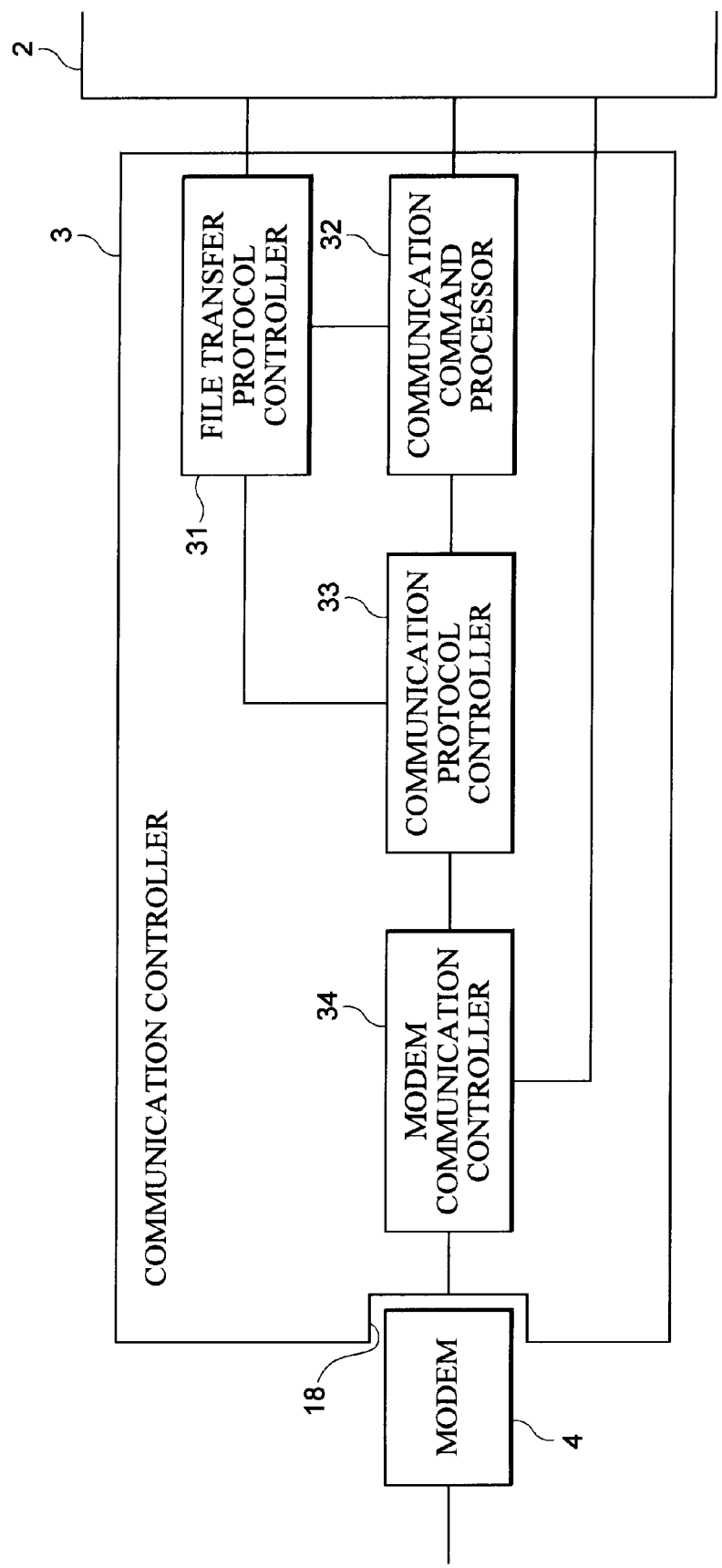
FIG. 4 is an explanatory view of a communication controller in the fusion splicer.

As shown in FIG. 3, the fusion splicer 1 is provided with the communication controller 3, which is a communication means. The communication controller 3 performs communication control in the fusion splicer 1, allowing the fusion splicer 1 to communicate with a service station. It has a function of transmitting each image data stored in the main memory 21 of the CPU 2 to the outside of the fusion splicer 1, i.e., to the service station, and a function of receiving a signal from the service station. Employable as a communication protocol between the fusion splicer 1 and the service station are non-procedural protocol, IP protocol, and the like. Employable as a transfer protocol between the fusion splicer 1 and the service station are XMODEM protocol, YMODEM protocol, ZMODEM protocol, KERMIT protocol, and the like based on non-procedural communication protocol. As shown in FIG. 4, for example, the communication controller 3 is constituted by a file transfer protocol controller 31, a communication command processor 32, a communication protocol controller 33, and a modem communication controller 34. The file transfer protocol controller 31 is used for transferring the stored still image file to the service station according to the protocol designated by the serviceperson of the service station or the protocol designated by the operator at the site of installation. The communication command processor 32 processes a communication command outputted from the CPU 2 when the operator instructs, via the operation unit 17, the fusion splicer 1 to transmit image data, for example. Also, the communication command processor 32 has a function of analyzing the contents of the communication command transmitted from the service station. The communication protocol controller 33 converts the communication command signal into the protocol that has already been coordinated with the service station side. The modem communication controller 34 effects serial communication with a modem so as to transmit/receive data and send command signals to the modem itself.

As shown in FIG. 4, the communication controller 3 is connectable to a modem 4 which effects signal conversion with respect to a public network. For example, the fusion splicer 1 is provided with a card insertion slot 18. When a card type modem such as PC card or bus card is inserted into the card insertion slot 18, the fusion splicer 1 is connected to the public network via the communication controller 3. Though the modem 4 for connecting the fusion splicer 1 to the public network may be of other types such as box type, a card type modem is preferably used from the viewpoint of mobility. For example, in the case of a card type modem, when connection to the public network is established by means of a cellular phone or the like, communication can be established from a site where an optical fiber is installed to the service station, whereby the maintenance of the fusion splicer 1 can be performed on site.

Thus, the communication controller 3 enables communication with the service station via the modem 4 and the public network, thereby making it possible to transmit the image data in the fusion splicing process to the service station and receive signals therefrom.

Also, the CPU 2 has a presetting parameter controlling function for changing, according to a presetting parameter adjustment signal transmitted from the service station at the time of communication, a presetting parameter concerning fusion splicing of the optical fibers. Namely, it has a function of receiving the presetting parameter adjustment signal transmitted from the service station and rewriting, in response to thereto, a parameter value stored and set in the main memory 21 concerning a fusion splicing operation. Thus, upon telecommunication with the service station, a presetting parameter concerning fusion splicing of the fusion splicer 1 can be changed. Accordingly, as the presetting parameter is changed, the fusion splicing of optical fibers can be optimized, whereby maintenance can be performed smoothly while the serviceperson stays at the service station.

Figure 5:
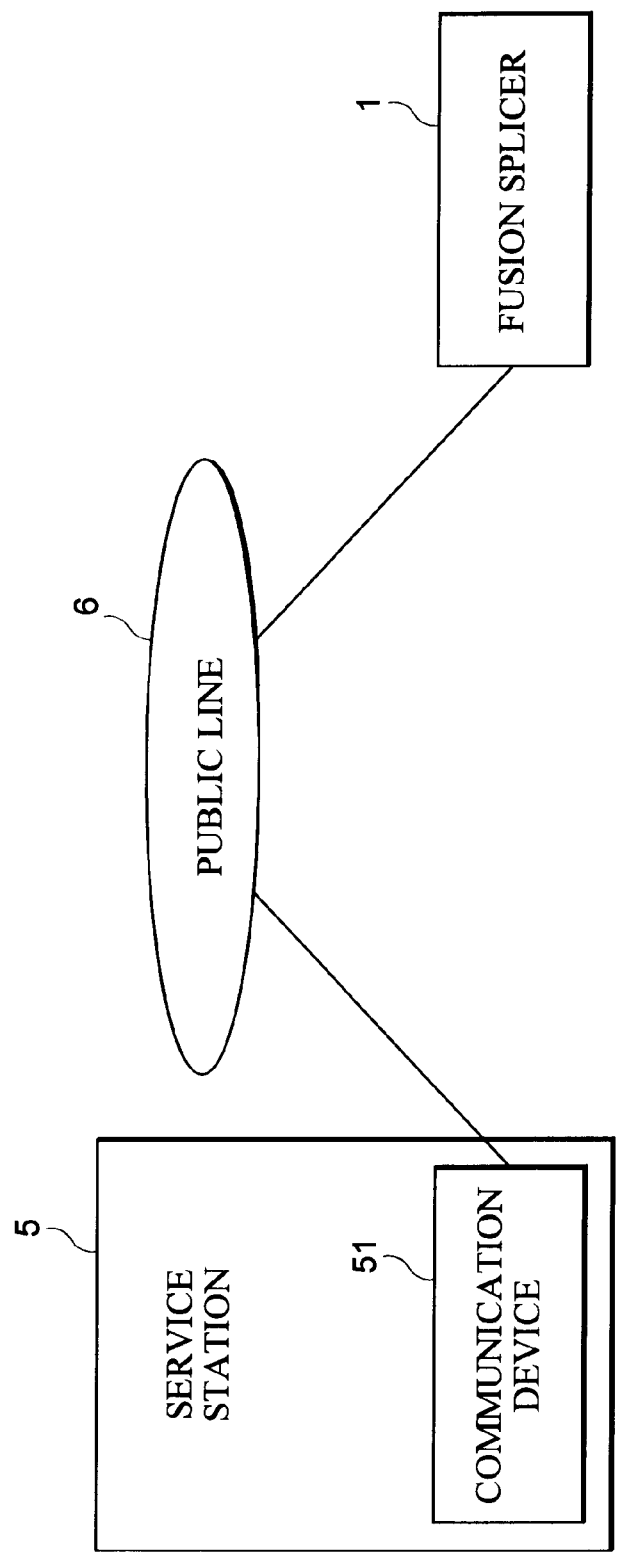
FIG. 5 is an explanatory view of a maintenance system using the fusion splicer.

FIG. 5 shows a maintenance system using the fusion splicer 1. As depicted, the fusion splicer 1 is connected to a service station 5 via the public network. As the public network, for example, an analog telephone line network (hereinafter referred to as "public line") is used. On the other hand, a communication device 51 which can communicate with the fusion splicer 1 is installed in the service station 5. The communication device 51 is connected to a public line 6 via a modem and has a communicating function similar to that of the above-mentioned communication controller 3, thus being able to communicate with the fusion splicer 1. As the public network, other networks such as digital data exchange network (DDX) and the like may also be used.

In the following, a method of maintaining the fusion splicer 1 will be explained.

In FIG. 5, when a trouble in operation of the fusion splicer 1 such as a malfunction thereof occurs at the site where optical fibers are installed, in order to communicate with the service station 5, the fusion splicer 1 is connected to the public line 6. Namely, a card type modem connected to the public line 6 is attached to the fusion splicer 1, whereby the fusion splicer 1 is connected to the public line 6 via this modem. Here, when a wireless cellular phone or the like is employed as a terminal equipment for the public line 6, the maintenance can be directly effected on site.

Upon connection to the public line 6, a mode selection menu is displayed on the monitor DP of the fusion splicer 1. Subsequently, a telecommunication mode, which is a mode for requesting maintenance, is selected from the mode selection menu. Upon this mode selection, a calling signal is transmitted from the communication controller 3 of the fusion splicer 1 to the service station 5 via the modem. When the communication controller 51 of the service station 5 receives the calling signal, the fusion splicer 1 attains an on-hook state. Then, the communication device 51 automatically dials to the fusion splicer 1, and the latter responds thereto, whereby a communication line between the fusion splicer 1 and the service station 5 is established.

Then, the communication device 51 of the service station 5 transmits a communication command for fusion splicing to the fusion splicer 1. Here, the communication device 51 also instructs the fusion splicer 1 to acquire image data (still image file) upon fusion splicing. In response thereto, the fusion splicer 1 analyzes the command, and performs fusion splicing while storing image data. At the point of time when the fusion splicing process is terminated, the fusion splicer 1 informs, by way of the public line 6, the communication device 51 in the service station 5 that the splicing process has completed. In response to this signal, the communication device 51 of the service station 5 designates a file transfer protocol, and requests of the fusion splicer 1 what image data are obtained at this fusion splicing process. In response to this request, the fusion splicer 1 transmits file information to the communication device 51 of the service station 5. The file information is information concerning the image data (still image file) stored in the main memory 21 of the CPU 2.

Then, according to the file information transmitted from the fusion splicer 1, the communication device 51 of the service station 5 displays an image file list onto the monitor DP. The image file list is a list of the image data stored in the fusion splicer 1. By observing the image file list, the serviceperson at the service station 5 can recognize, at a glance, to which step the fusion splicer 1 operates normally, and thus can instantly grasp the trouble of the fusion splicer 1. Also, in view of the image file list, the serviceperson designates the image data to be acquired therefrom. In response to this designation, the fusion splicer 1 transfers the image data to the service station 5. Here, the image data to be transferred are those stored during the fusion splicing process. For example, when the fusion splicing process is completely effected to its final step of fusion splice inspection, all the image data from the brightness inspection to the fusion splice inspection are transmitted. On the other hand, when the fusion splicing process is effected only to an intermediate step (e.g., brightness inspection, rough centering, or the like), the image data stored until this step are transferred. Then, by confirming and referring to the transferred data when appropriate, the serviceperson can grasp the state of trouble of the fusion splicer 1 in detail.

For example, when the image data stored until the brightness inspection in X axis are transmitted, it can be presumed that, for example, the amount of emission of the illumination 13*a* is insufficient due to deterioration thereof over time or the like, the presetting reference parameter for the brightness inspection (one of presetting parameter in the fusion splicer 1) is set inappropriately, or dust is attached to the objective lens of the microscope in the camera 14, thus yielding a trouble. For the maintenance in this case, at first, the installation site side is instructed to remove the dust attached to the objective lens. If the trouble cannot be eliminated thereby, then the communication device 51 is used for adjusting the presetting reference parameter according to a communication command.

When the image data stored until the brightness control in Y axis are transmitted, maintenance concerning the illumination 13*b* is performed similarly to the above-mentioned case where the image data stored until the brightness control in X axis are transmitted.

In the case where the image data stored until the point of time when the optical fibers to be spliced are set on the alignment stages STG1 and STG2 are transmitted, it can be presumed that, for example, the driving mechanism 12 for moving the alignment stages STG1 and STG2 is in trouble, a limit sensor of the driving mechanism 12 is in trouble, or a presetting driving parameter concerning the driving mechanism 12 is inappropriate. For the maintenance in this case, the presetting parameter is adjusted by a communication command, and the operation state of the limit sensor is confirmed by a communication command.

In the case where the image data stored until the discharge cleaning (sputtering) of the optical fiber splicing section or rough centering of the optical fibers are transmitted, it can be presumed that, for example, dust is attached to the optical fiber surface, dust is attached to the objective lens of the microscope, a motor or cam in the driving mechanism 12 is in trouble, or the limit sensor of the driving mechanism 12 is in trouble. For the maintenance in this case, an instruction for removal of the attached dust is issued. If the trouble is not eliminated thereby, then the communication device 51 is used so as to adjust, according to a communication command, a presetting parameter for the number or duration of discharge cleaning operations in the fusion splicer 1, presetting motor driving parameter in the driving mechanism 12, or permissible amount of dust. Alternatively, the operation state of the limit sensor is confirmed by a communication command.

In the case where the image data stored until the focus adjustment of the microscope of the CCD camera 14 in X axis are transmitted, it can be presumed that, for example, the driving mechanism 12 is in trouble, dust is attached to the objective lens of the microscope, the microscope itself is in trouble (focusing is impossible due to positional deviation of the microscope), or the limit sensor is in trouble. For the maintenance in this case, an instruction for removal of the attached dust is issued. If the trouble is not eliminated thereby, then a presetting parameter for the motor driving of the driving mechanism 12 or permissible amount of dust is adjusted according to a communication command. Alternatively, the operation state of the limit sensor is confirmed by a communication command.

When the image data stored until the focus adjustment of the microscope of the CCD camera 14 in Y axis are transmitted, the maintenance is performed similarly to the above-mentioned case where the image data stored until the focus adjustment of the microscope of the CCD camera 14 in X axis are transmitted.

In the case where the image data stored until the minute adjustment of the distance between end faces of the optical fibers to be spliced are transmitted, it can be presumed that, for example, the driving mechanism is in trouble, or a presetting parameter for the butting distance is set inappropriately. For the maintenance in this case, with reference to the images of the respective image data, a presetting parameter for the motor driving of the driving mechanism 12 or butting distance is adjusted according to a communication command.

In the case where the image data stored until the end face inspection of optical fibers in Y axis are transmitted, it is presumed that, for example, the end face of the optical fiber is not appropriately cut, dust is attached to the end face of the optical fiber, or the end face is deformed by discharge cleaning, thus yielding a trouble. For the maintenance in this case, with reference to the respective image data and the like, a presetting parameter for sputtering or permissible amount of dust is adjusted according to a communication command.

When the image data stored until the end face inspection of optical fibers in X axis are transmitted, presumable are troubles similar to those in the above-mentioned case where the image data stored until the end face inspection of optical fibers in Y axis are transmitted. Accordingly, maintenance is performed similarly thereto.

In the case where the image data stored until the outer diameter centering or core centering of optical fibers in the X-axis direction are transmitted, it is presumed that, for example, the optical fiber itself is inappropriate since its amount of eccentricity is too large and so forth, the driving mechanism 12 is in trouble, or dust is attached to the core portion of the optical fiber. For the maintenance in this case, with reference to the respective image data and the like, a presetting parameter for the motor driving of the driving mechanism 12 or permissible amount of dust is adjusted according to a communication command.

When the image data stored until the outer diameter centering or core centering of optical fibers in Y axis are transmitted, presumable are troubles similar to those in the above-mentioned case where the image data stored until the outer diameter centering or core centering of optical fibers in X axis are transmitted. Accordingly, maintenance is performed similarly thereto.

In the case where the image data stored until the splice inspection (in X and Y axes) upon or after the fusion splicing effected by discharge are transmitted, it can be presumed that the discharge output is inappropriate, the discharge time is inappropriate, the stuffing stroke of the optical fibers on the right and left sides upon discharge (fusion splicing) are inappropriate, or the discharge electrodes are in trouble (e.g., the electrodes positionally deviate). For the maintenance in this case, with reference to the respective image data and the like, a presetting parameter for discharge output level, discharge time, or amount of thrust is adjusted according to a communication command.

Thus, according to the image data transmitted from the fusion splicer 1, the operation state of the fusion splicer 1 can be grasped accurately and easily at the service station 5. Accordingly, in order to eliminate the trouble in operation of the fusion splicer 1, operator of the fusion splicer 1 such as a person for installing and operating optical fibers can be provided with an appropriate advice, whereby maintenance of the fusion splicer 1 can be performed. Also, depending on the trouble in operation of the fusion splicer 1, the presetting of various parameter values concerning operations of the fusion splicer 1 can be adjusted by telecommunication with the communication device 51 of the service station 5, so as to effect maintenance of the fusion splicer 1.

As mentioned above, in the fusion splicer 1 in accordance with this embodiment, when there is a trouble in its operation, stored image data are transmitted to the service station 5, whereby the state of trouble in the fusion splicer 1 can be accurately grasped at the service station 5 side according to these image data, thus allowing the operator to be provided with an appropriate advice concerning the trouble of the fusion splicer 1. As a result, minor troubles and the like can be easily solved without the serviceperson going to the site of use of the fusion splicer or the fusion splicer being sent back. Accordingly, the maintenance of the fusion splicer can be made efficient.

Also, in the case where presetting parameter control means for changing a presetting parameter of operation concerning fusion splicing of optical fibers is provided, when the trouble in operation of the fusion splicer is caused by maladjustment of the presetting parameter concerning the operation thereof, more accurate maintenance of the fusion splicer can be performed by adjusting this presetting parameter. Accordingly, the maintenance can be effected efficiently.

As explained in the foregoing, the following effects can be obtained in accordance with the present invention.

Namely, when there is a trouble in operation of the fusion splicer, stored image data are transmitted to a service station, whereby the service station can accurately grasp the trouble of the fusion splicer according to the image data, thus being able to provide the operator of the fusion splicer with an appropriate advice. Accordingly, the maintenance of the fusion splicer can be performed efficiently.

Also, in the case where presetting parameter control means for changing a presetting parameter of operation concerning fusion splicing of optical fibers is provided, when the trouble in operation of the fusion splicer is caused by maladjustment of the presetting parameter concerning the operation thereof, by adjusting the presetting parameter, accurate maintenance of the fusion splicer can be effected, thereby making the maintenance efficient.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber fusion splicer comprising:
an image sensor for imaging ends of optical fibers facing each other and generating image data indicative thereof;
a memory for storing said image data; and
a communication device, connectable to a telephone line, for transmitting said image data.

2. An optical fiber fusion splicer comprising:
an image sensor for imaging ends of optical fibers facing each other and generating image data indicative thereof;
a memory for storing said image data; and
a communication device for transmitting said image data, said communication device being adapted to communicate with a service station by way of a telephone communication path; said optical fiber splicer further comprising presetting parameter control means for changing, in response to a signal transmitted from said service station, a presetting parameter for an operation concerning fusion splicing of said optical fibers.

* * * * *